Figure 1:
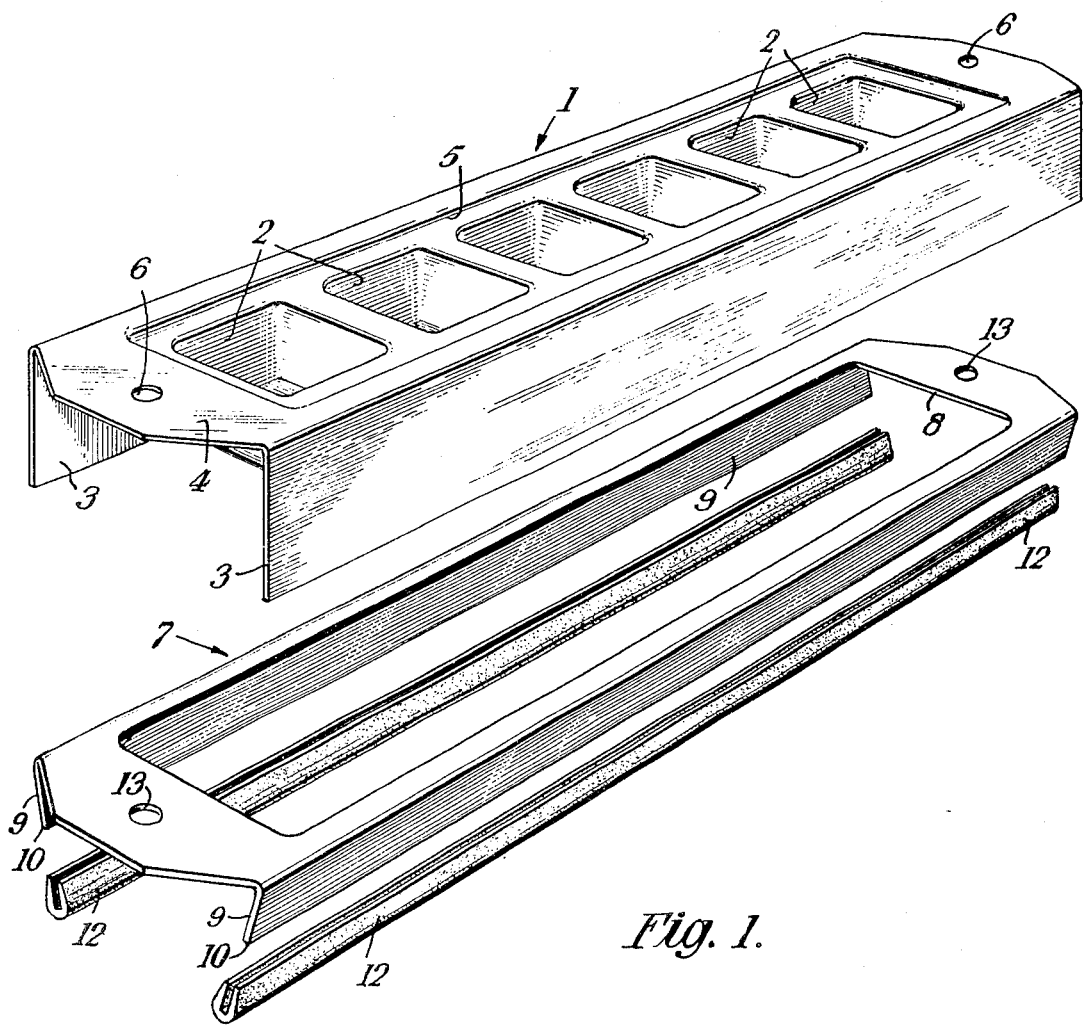

United States Patent [19]

Steels et al.

[11] 3,981,656

[45] Sept. 21, 1976

[54] MOULDING OF HIGH BOILED SUGAR AND LIKE CONFECTIONS

[75] Inventors: Gordon Steels, Peterborough; Terence John Blore, Deeping St. James, near Peterborough, both of England

[73] Assignee: Baker Perkins Holdings Limited, Great Britain

[22] Filed: Apr. 18, 1975

[21] Appl. No.: 569,392

[30] Foreign Application Priority Data

Apr. 22, 1974 United Kingdom............... 17523/74

[52] U.S. Cl................................ 425/182; 220/23.4; 249/139; 425/195; 425/453

[51] Int. Cl.²........................................... A23G 3/12

[58] Field of Search............ 425/195, DIG. 55, 182; 249/134, 120, 127, 139, 102; 220/23.4, 23.2, 80; 99/427, 443 C

[56] References Cited

UNITED STATES PATENTS

| | | | |
|---|---|---|---|
| 986,500 | 3/1911 | Reiche | 249/139 |
| 1,783,402 | 12/1930 | Cahoon | 425/195 |
| 3,010,157 | 11/1961 | Cizek | 425/DIG. 55 |
| 3,561,372 | 2/1971 | Vogt | 425/195 X |
| 3,572,537 | 3/1971 | Baltzer | 220/23.4 |

*Primary Examiner*—Francis S. Husar
*Assistant Examiner*—David S. Safran
*Attorney, Agent, or Firm*—Watson, Cole, Grindle & Watson

[57] ABSTRACT

A mould for use in a confectionery moulding plant and consisting of a thin flexible sheet of plastics material which is vacuum or pressure formed with at least one moulding cavity extending downwardly from it and has at its sides downwardly extending flanges whereby it may be detachably secured to a supporting carrier frame.

5 Claims, 5 Drawing Figures

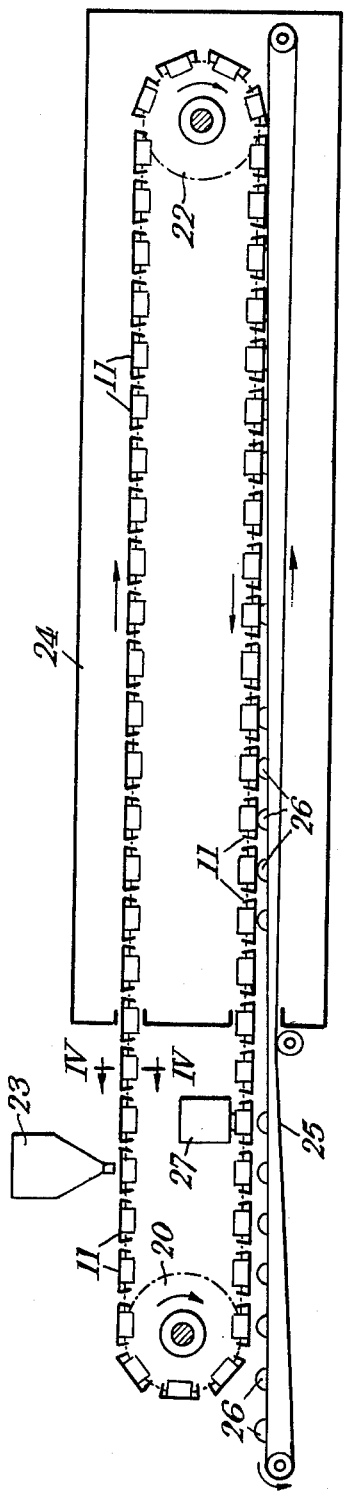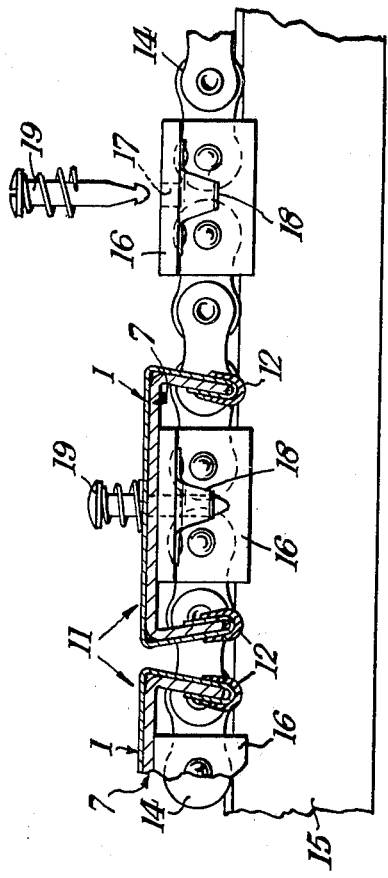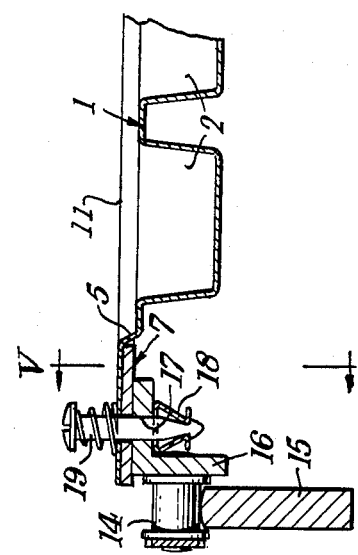

3,981,656

MOULDING OF HIGH BOILED SUGAR AND LIKE CONFECTIONS

This invention relates to a confectionery moulding plant.

It is known to discharge sugar from a cooker by means of a moving head depositor into the mould cavities of moulds attached at their ends to parallel conveyor chains, the moulded sweets being discharged from the downwardly facing moulds on the return run of the conveyor.

Moulds at present in use for moulding hard candy are die cast from metal, each mould cavity having in its base a spring loaded ejector pin. Such moulds cannot be used for soft fondants which would be damaged by the ejector pins. Moulds hitherto used for such soft products are of silicone rubber moulded around a metal frame, or of metal with small holes in the mould cavities which provide for pneumatic ejection.

When the confectionery manufacturer wishes to change the shape of the moulded sweets it is necessary for him to fit a fresh set of moulds and this is a very expensive undertaking. Some hundreds of moulds may be used in the plant and the moulds for hard candy are expensive because of the requirement for ejector pins in each mould cavity in each mould. Moreover, the silicone rubber moulds for soft fondant are inseparable from the carrier frames so that a fresh set of carrier frames is required when the moulds need to be changed.

With a view to reduction in the cost of the moulds required for a confectionery moulding plant, the invention provides a mould for use therein which consists of a thin, flexible sheet of plastic material which is vacuum or pressure formed with at least one moulding cavity extending downwardly from it and has at its sides downwardly extending flanges whereby it may be detachably secured to a supporting carrier frame.

Owing to the thinness and flexibility of the moulds, discharge of the moulded sweets presents no problem and the mould cavities require no ejector pins. The sweets normally fall out of the mould cavities when the moulds are inverted but, if necessary, slight pressure can be exerted on the rear faces of the moulds at the discharge station.

Preferably, the moulds are made of polyethylene terephthalate or polytetrafluoroethylene (P.T.F.E.), i.e., the material sold under the Registered Trade Mark of E. I. du Pont de Nemours and Co. "Teflon". The well known anti-stick properties of these materials facilitate release of the moulded sweets from the mould cavities.

Figure 2:
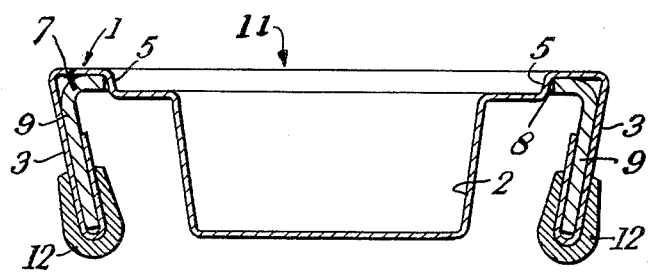

A mould, in accordance with the invention, together with confectionery moulding plant in which the mould may be used, will now be described, by way of example, with reference to the accompanying drawings, in which:

FIG. 1 is an exploded perspective view showing the mould, an associated carrier frame and securing clips, FIG. 2 is a sectional view through the assembled mould, carrier frame and clips, FIG. 3 is a schematic side view of the confectionery moulding plant, FIG. 4 is a fragmentary sectional view to an enlarged scale, on the line IV—IV of FIG. 3, and FIG. 5 is a fragmentary sectional view on the line V—V of FIG. 4.

The mould 1 is made from a sheet of P.T.F.E. which is vacuum (or alternatively pressure) formed into the shape shown in FIG. 1. As can be seen, the mould 1 has a row of downwardly extending moulding cavities 2 and two side flanges 3 extending downwardly from the upper surface 4 of the mould. The central portion of the surface 4 is formed with a shallow recess 5 which surrounds the cavities 2 and the outline of which is of elongated rectangular shape. At the ends of the mould 1, the surface 4 has holes 6.

A metallic carrier frame 7 is used to support the mould 1. The frame 7 has a central rectangular aperture 8 and side flanges 9 which extend downwardly and slightly inwardly towards lower edges 10. The mould 1 is detachably secured to the frame 7 by locating the recess 5 in the aperture 8, which affords registration of the mould 1 with respect to the frame 7, bending the flanges 3 of the mould 1 around the edges 10 of the flanges 9 (flanges 3 being larger than the flanges 9 for this purpose) and clipping the flanges on each side of the mould by a U-shaped clip 12 of nylon or other suitable material. The clips 12 extend for the full length of the mould, but a plurality of shorter clips may alternatively be employed at each side of the mould. The frame 7 has holes 13 registering with the holes 6 in the mould 1. The mould assembly 11 comprising the mould 1, carrier frame 7 and clips 12 is shown in section in FIG. 2.

The mould assembly 11 of FIG. 2 is detachably secured to two spaced drive chains in such manner that the mould assembly spans the chains. FIG. 4 shows the connection of one end of the mould assembly 11 to the corresponding chain 14, it being understood that the other end of the mould assembly 11 is connected to the other chain in an analogous manner. Referring to FIGS. 4 and 5, the chain 14 runs on a support 15 and carries a bracket 16, one flange of which has a through bore 17 and carries a spring detent 18 which is engageable with the notched shank of a headed stud 19 passed through the aligned holes 6 and 13 at the corresponding end of the mould assembly 11. The stud 19 and spring detent 18 form a quick-release device (known per se) which enables the mould assembly 11 to be rapidly attached to or detached from the brackets 16, attachment occurring automatically with a snap action on passing the stud 19 between the spring leaves of the detent 18 whilst detachment is achieved by turning the stud 19 through ninety degrees (with the aid of the cross slot in the head) and withdrawing the stud 19 from the spring detent 18. The chains 14 support a plurality of mould assemblies 11 in the manner shown in FIG. 5, the right-hand end of this figure indicating a vacant mould station at which the mould assembly has been removed.

FIG. 3 is a schematic side view of the complete moulding plant in which the plurality of mould assemblies 11 are conveyed in a continuous manner around an endless loop path by the two chains 14 which pass around end sprockets 20 and 22 rotating in the directions indicated by the arrows marked thereon. Near the start of the upper horizontal run of the chains 14, a depositor 23 fills the mould cavities 2 with confectionery material. The filled moulds 1 then enter a cooling enclosure 24, pass around the right hand sprockets 22 and then commence their return run, during which the confectionery pieces 26 fall from the inverted moulds onto a continuous belt conveyor 25 from which the moulded confectionery pieces 26 are removed. Should any pieces not fall from the inverted moulds by gravity, a demoulding device 27 is provided to ensure that all cavities are vacated before the mould assemblies 11 pass around the end sprockets 20 ready for re-filling by the depositor 23.

When it is desired to change the moulds, the required number of mould assemblies 11 are readily detached from the brackets 16 by releasing the studs 19. Replacement mould assemblies, each of which comprises a carrier frame 7 supporting the replacement mould in the manner previously described, are then attached to the brackets 16 at the vacant locations. Since the moulds 1 can be easily removed from the carrier frame 7, it is not necessary to have the same number of carrier frames 7 as moulds 1, providing that there are sufficient frames 7 not fitted to the chains 14 to provide the requisite number of replacements at any one time.

To assist in demoulding, a small hole may be made in the bottom of each mould cavity 2. An air plenum chamber may be incorporated in the demoulding device 27 in such a manner that the back of each mould will be subjected to air pressure sufficient to penetrate the mould and break the vacuum between the mould and confectionery piece and so allow it to fall out. The pressure would be such as not to damage the product.

We claim:

1. A mould assembly for use in a confectionery moulding plant, said assembly comprising
    a rigid, generally rectangular carrier frame having an upper portion formed with a central rectangular aperture therethrough and opposed depending side flanges extending downwardly with respect to said upper portion, said carrier frame also having end portions thereon adapted so as to enable attachment of said mould assembly to spaced driving chains in said moulding plant,
    a mould constituted of a generally rectangular sheet of thin, flexible plastic material, said sheet having a central rectangular, recessed portion which is located within said aperture in said carrier frame, being formed with at least one moulding cavity extending downwardly through said aperture, and also having opposed depending side flanges which extend alongside outer surfaces of said side flanges on the carrier frame, said mold flanges having lower portions which are bent upwardly to extend alongside inner surfaces of the side flanges of the carrier frame, and
    clips of U-shaped cross-section which are fitted over said side flanges on the mould to thereby removably attach them to the side flanges on the carrier frame.

2. A mould assembly as claimed in claim 1, wherein said side flanges on said carrier frame are convergent.

3. A mould assembly as claimed in claim 1 wherein said mould has a plurality of adjoining moulding cavities disposed in a row lengthwise of said mould.

4. A mould assembly as claimed in claim 1, wherein said mould has end portions formed with holes therethrough for registering with like holes in said carrier frame for attaching said assembly to said driving chains.

5. In a confectionery moulding plant, the combination of a pair of spaced drive chains, a plurality of mould assemblies as claimed in claim 1 disposed on inwardly facing brackets affixed to said chains, and snap fasteners extending through holes in said end portions of the carrier frames and through holes in said brackets to removably attach the mould assemblies to the chains.

* * * * *